US012258783B2

(12) United States Patent
Fredriksson et al.

(10) Patent No.: US 12,258,783 B2
(45) Date of Patent: Mar. 25, 2025

(54) METHOD FOR PROTECTING A PADLOCK, AND A PADLOCK COVER DEVICE

(71) Applicant: ANCHOR LÅS AB, Eskilstuna (SE)

(72) Inventors: Robert Fredriksson, Eskilstuna (SE); Tomas Eriksson, Kvicksund (SE); Olov Nyquist, Hägersten (SE)

(73) Assignee: ANCHOR LÅS AB, Eskilstuna (SE)

( * ) Notice: Subject to any disclaimer, the term of this patent is extended or adjusted under 35 U.S.C. 154(b) by 0 days.

(21) Appl. No.: 18/718,665

(22) PCT Filed: Dec. 8, 2022

(86) PCT No.: PCT/SE2022/051162

§ 371 (c)(1),
(2) Date: Jun. 11, 2024

(87) PCT Pub. No.: WO2023/121536

PCT Pub. Date: Jun. 29, 2023

(65) Prior Publication Data

US 2024/0418002 A1 Dec. 19, 2024

(30) Foreign Application Priority Data

Dec. 21, 2021 (SE) .................................... 2151581-2

(51) Int. Cl.
*E05B 17/14* (2006.01)

(52) U.S. Cl.
CPC .................................. *E05B 17/142* (2013.01)

(58) Field of Classification Search
CPC ...... E05B 17/14; E05B 17/142; E05B 17/002; E05B 67/02; E05B 67/04; E05B 67/38; Y10T 70/491; Y10T 70/493; Y10T 70/496

(Continued)

(56) References Cited

U.S. PATENT DOCUMENTS 1,369,506 A * 2/1921 Voight .................. E05B 17/183
70/455
3,858,419 A 1/1975 Hampton
(Continued)

FOREIGN PATENT DOCUMENTS

DE 102011000378 A1 8/2012
EP 3276111 A1 1/2018
EP 3550098 A1 10/2019

OTHER PUBLICATIONS

International Search Report and Written Opinion for Patent Cooperation Treaty Application No. PCT/SE2022/051162, dated Jun. 29, 2023, 9 pages.

*Primary Examiner* — Suzanne L Barrett
(74) *Attorney, Agent, or Firm* — ALSTON & BIRD LLP

(57) ABSTRACT

A method is provided to protect a padlock from the environment, where the padlock comprises a padlock body comprising a cavity and an opening connecting the cavity with the environment, by using a covering device comprising a sealing device and a locking device, and by placing the sealing device against a first end of the padlock body by pivoting the sealing device in correlation to and towards the padlock body and placing the locking device to cover the sealing device and bringing the locking device into locking cooperation with the padlock body by pivoting the locking device in correlation to and towards the sealing device and towards the padlock body. Also described is a padlock body, a padlock, and a cover device.

12 Claims, 5 Drawing Sheets

(58) Field of Classification Search
USPC .................................. 70/20, 54–56, 455, 417
See application file for complete search history.

(56) References Cited

U.S. PATENT DOCUMENTS

| | | | | |
|---|---|---|---|---|
| 4,218,902 | A * | 8/1980 | Druschel ............... | E05B 17/002 70/55 |
| 5,033,279 | A | 7/1991 | Lebrecht | |
| 5,761,935 | A * | 6/1998 | Adelmeyer ........... | E05B 17/002 70/455 |
| 6,467,316 | B1 | 10/2002 | Chen | |
| 6,813,914 | B2 * | 11/2004 | Chen ..................... | E05B 17/002 70/52 |
| 7,334,437 | B2 * | 2/2008 | Meyer ..................... | E05B 67/02 70/417 |
| 7,581,423 | B2 * | 9/2009 | Brojanac ............... | E05B 17/002 70/52 |
| D702,103 | S * | 4/2014 | Zakiuddin Shahpurwala ............. | D8/343 |
| D724,931 | S * | 3/2015 | Dudgeon ........................ | D8/343 |
| 9,670,699 | B2 * | 6/2017 | Sallinen ................ | E05B 17/002 |
| 10,584,517 | B2 * | 3/2020 | Bhanpurawala ........ | E05B 67/02 |
| 10,801,233 | B2 * | 10/2020 | Pedersen ............. | E05B 47/0045 |
| D942,243 | S * | 2/2022 | Bhanpurawala ............... | D8/334 |
| 2004/0055342 | A1 | 3/2004 | Chen | |
| 2016/0002958 | A1 | 1/2016 | Kiu | |

* cited by examiner

METHOD FOR PROTECTING A PADLOCK, AND A PADLOCK COVER DEVICE

CROSS REFERENCE TO RELATED APPLICATIONS

This application is a National Stage Application, filed under 35 U.S.C. § 371, of International Application No. PCT/SE2022/051162, filed Dec. 8, 2022, which international application claims priority to and the benefit of Swedish Application No. 2151581-2, filed Dec. 21, 2021; the contents of both of which as are hereby incorporated by reference in their entireties.

BACKGROUND

Related Field

The present invention relates to a method for protecting a padlock from the environment, a padlock body, a padlock comprising such a padlock body and a cover device.

Description of Related Art

A padlock is a detachable locking device comprising three basic components: a padlock body, a shackle and a locking mechanism. The padlock body comprises an internal cavity holding the locking mechanism. The shackle works with what is being secured, locked, by the padlock (e.g., chain link or hasp) and is usually elongated and has two ends. The shackle can be straight but usually the shackle is looped, somewhat U-shaped. A first end of the shackle is attached to the padlock body in a pivotal and/or rotatable manner and a second end, when the padlock is to be secured and locked in a working position, is to be pivoted/rotated and placed into an opening in the padlock body to get into a position where the locking mechanism is working on the second end of the shackle end and by that locking the padlock.

The locking mechanism comprises a locking cylinder inserted into the cavity inside the padlock body. The locking cylinder has in one end, the end being first inserted into the padlock body, devices working on parts in the padlock body placed at the second end of the shackle when locking and unlocking the padlock. In the other end of the locking cylinder there is a key opening into which a key is inserted. When using the key the locking mechanism is activated and the padlock can be locked or unlocked.

A problem with such a padlock is that the function of the padlock is affected by the environmental situation. Weather and wind, impurities, dust and contaminations etc. in the environment are working on parts of the padlock in a negative way. The padlock will not work in a proper way after some time of use in such an environment.

There has been done some design experiments using different boxes, bags etc. covering the whole padlock and being needed to be removed when the padlock will be locked or unlocked.

BRIEF SUMMARY

One object of the present invention is to present a method for making the work situation for a padlock less dependent on the environment situation. Another object of the present invention is to present a padlock body that will be an active part in making that possible and a padlock comprising such a padlock body, being able to work unaffected by the environment situation. The invention also concerns a cover device that can be attached to an existing padlock to give the padlock the safe and secure work conditions.

The main focus of the invention is to present a method for stopping the environment to get in contact with vital parts of the padlock, to present a padlock body having parts stopping the environment to affect vital parts of the padlock, to present a padlock having such a padlock body parts stopping the environment to get in contact with vital parts of the padlock and a cover device to be used as an attachable cover device, to any padlock, stopping the environment to affect vital parts of the padlock.

Such a method is described in patent claim 1, such a padlock body is described in claim 4, such a padlock is described in claim 10 and such a cover device is described in claim 11.

BRIEF DESCRIPTION OF THE FIGURES

The invention will now be described, by way of example, with reference to the accompanying drawings, in which.

DETAILED DESCRIPTION OF VARIOUS EMBODIMENTS

The following text is a detailed description of the invention.

A method according to the present invention is used for protecting a padlock 1 from the environment. The method is designed for a padlock 1 comprising a padlock body 2.

Figure 1:
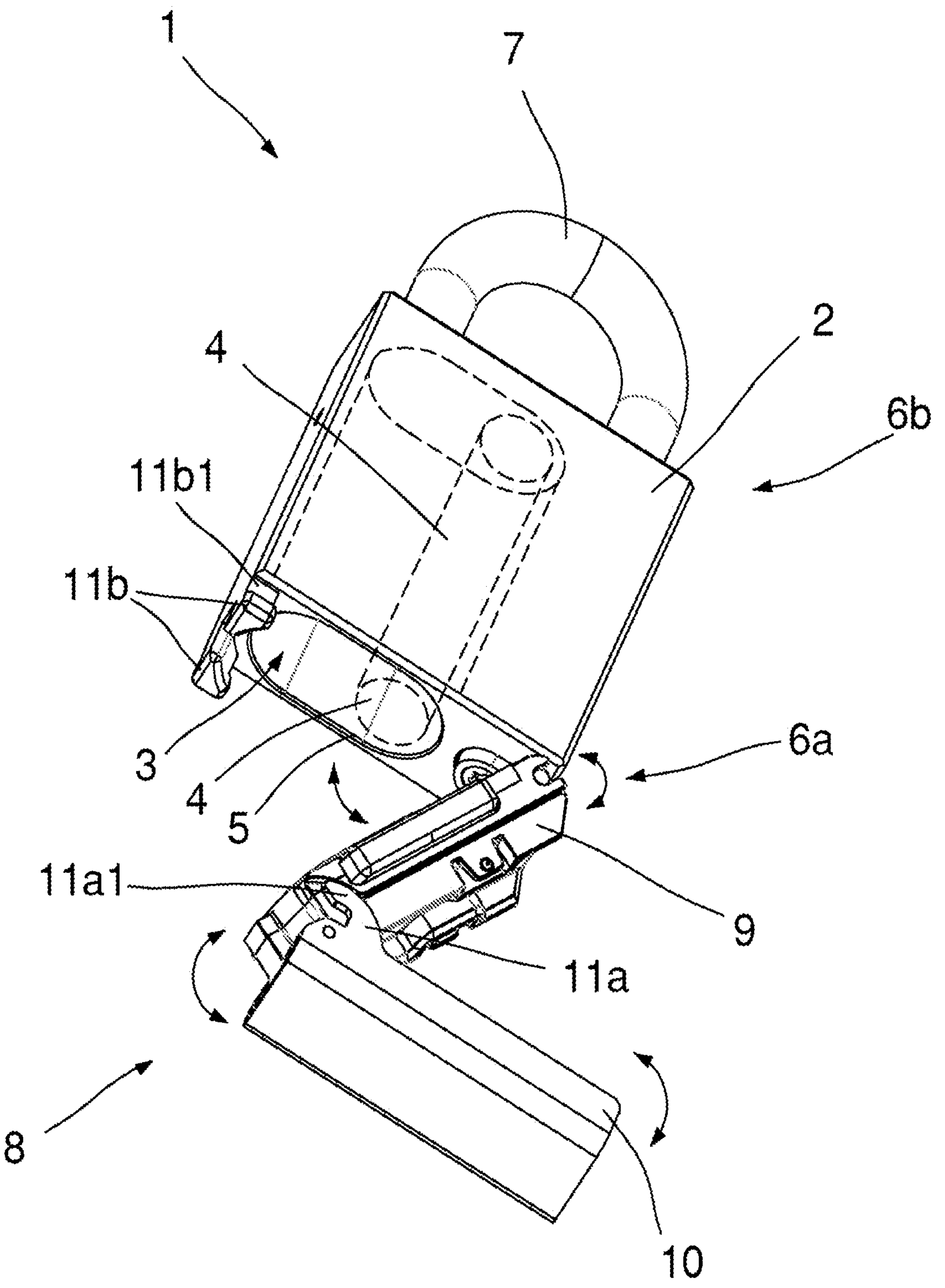
FIG. 1 shows a padlock according to the present invention seen obliquely from below having a cover device not fully attached to the padlock body.

The padlock body 2 comprises a cavity 3, and an opening 5. The cavity 3 is holding a lock cylinder 4 when the padlock is equipped for working. The opening 5 is provided in a first end **6*a* of the padlock body 2 and is connecting the cavity 3 with the environment. The lock cylinder 4 is inserted through the opening 5 and into the cavity 3. See FIG. 1**.

A shackle 7 is attached to the padlock body 2, in a second end **6*b* of the padlock body 2, opposite the first end 6*a*. The shackle 7 is of ordinary type having one end 7*a* movable attached to the padlock body 2 and another end 7*b* to be cooperating with the lock cylinder 4 for locking the shackle 7 and the padlock body 2 to each other, representing a working position of the padlock 1**.

One common construction of a lock cylinder and a shackle is that a first construction, for example a plug, within the lock cylinder that, with a correct key construction, turns and allows a locking mechanism of the lock cylinder to retract from a second construction, for example notches cut into the shackle. This locking mechanism is not part of the invention and therefore not shown in any picture.

Figure 2:
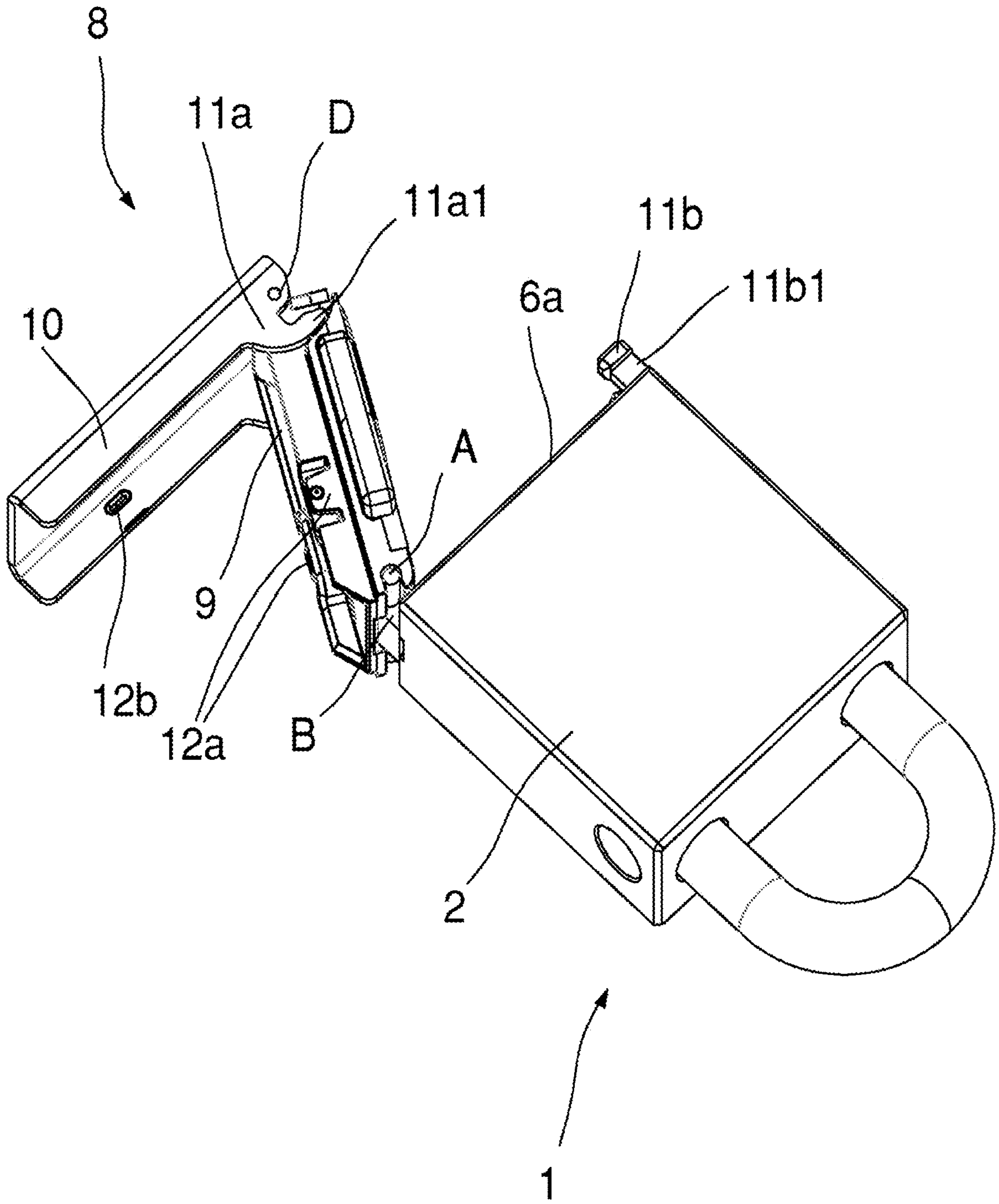
FIG. 2 shows the padlock according to the present invention seen obliquely from above, in another angle.

The method comprises covering the first end **6*a* of the padlock body 2 by using a covering device 8. See FIGS. 1 and 2. The covering device 8 comprises a sealing device 9 and a locking device 10. By placing the sealing device 9** against the first end 6_a_ of the padlock body 2, placing the locking device 10 to cover the sealing device 9, and bringing the locking device 10 into locking cooperation with the padlock body 2, the covering device 8 is firmly and safely connected to the padlock 1. The covering is made by pivoting the sealing device 9 in correlation to and towards the padlock body 2 and by pivoting the locking device 10 in correlation to the sealing device 9 and pushing the locking device 10 towards the sealing device 9 and towards the padlock body 2.

Figure 3:
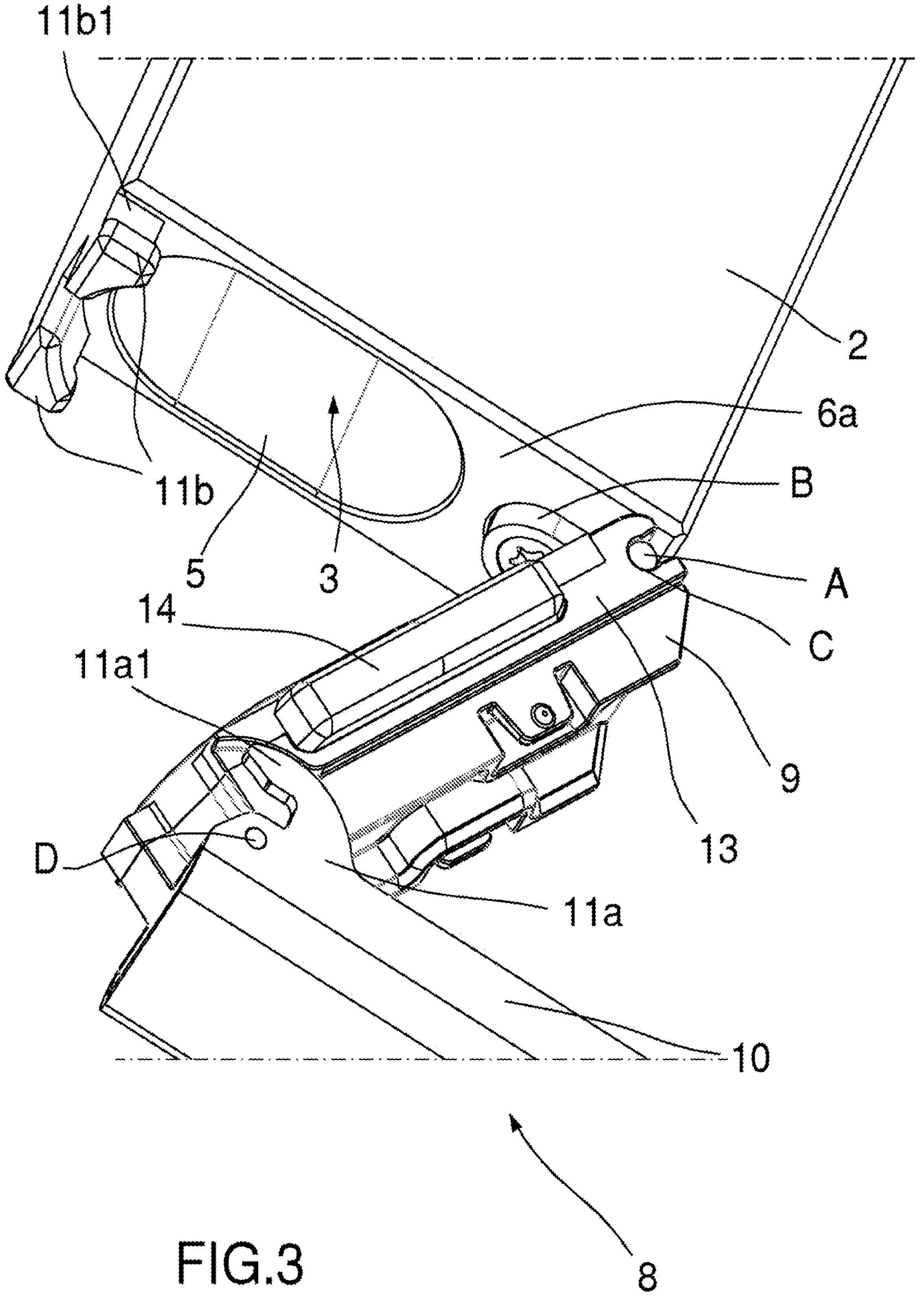
FIG. 3 shows a padlock according to the present invention seen in a close-up of the first side of the padlock body and the cover device.

The pivoting of the sealing device 9 is made possible by use of a first axis of rotation A being a part of, or connected to, the padlock body 2. The first axis A is part of a connecting device B firmly attached to the padlock body 2. In the construction of the padlock 1 and the covering device 8, shown in FIG. 2, the connecting device B is attached to the first side 6_a_ of padlock body 2. The connecting device B comprises the first axle A and the sealing device 9 comprises a recess C receiving the first axis A in a way allowing the sealing device 9 to pivote, rotate, turn around the first axis A. See FIG. 3.

The pivoting of the locking device 10 is made possible by use of a second axis of rotation D being a part of, or connected to, the sealing device 9 or the locking device 10. The sealing device 9 comprises a recess E receiving the second axis of rotation D in a way allowing the locking device 10 to pivote, rotate, turn around the second axis D.

By pivoting the locking device 10 against the sealing device 9 and the padlock body 2, a locking function is activated between first and second parts 11_a_ and 11_b_ being parts of the locking device 10 and the padlock body 2. The first parts 11_a_ and the second parts 11_b_ are brought into cooperation with each other and get into cooperation by the pivoting of the locking device 10 when the sealing device 9 is in contact with the first side 6_a_ of the padlock body 2. The first parts 11_a_ are parts of the locking device 10 and each first part 11_a_ has a hook 11_a_1 that, when the locking part 10 is pivoted, will be hooked into the second parts 11_b_, being part of the padlock body 2, having a notch 11_b_1 designed for receiving the first part 11_a_, the hook 11_a_1. By pivoting the locking device 10 against the sealing device 9 it is also possible to activate a snap/grip function between cooperating parts 12_a_ and 12_b_ of the sealing device 9 and the locking device 10.

A padlock body 2 according to the present invention comprises a cavity 3 and an opening 5 at first end 6_a_ of the padlock body 2, through which opening a lock cylinder 4 is to be inserted when forming a working padlock 1. Through the opening 5 the cavity 3 is in communication with the outside, the environment.

The padlock body 2 comprises a covering device 8, attached to the padlock body 2 to cover the first end 6_a_ of the padlock body 2 comprising the opening 5.

The covering device 8 comprises a sealing device 9 and a locking device 10. The sealing device 9 is adapted to be placed and held against the first end 6_a_ of the padlock body 2 by the locking device 10. The sealing device 9 is pivotally attached to the padlock body 2 and the locking device 10 is pivotally attached to the sealing device 9.

Two cooperating first parts 11_a_ and 11_b_ of the locking device 10 and the padlock body 2 activates a locking function between the locking device 10 and the padlock body 2.

The padlock body 2 comprises cooperating second parts 12_a_ and 12_b_ of the sealing device 9 and the locking device 10 activating a snap/grip function between the sealing device 9 and the locking device 10 holding and gripping the locking device 10 against the sealing device 9.

Figure 4:
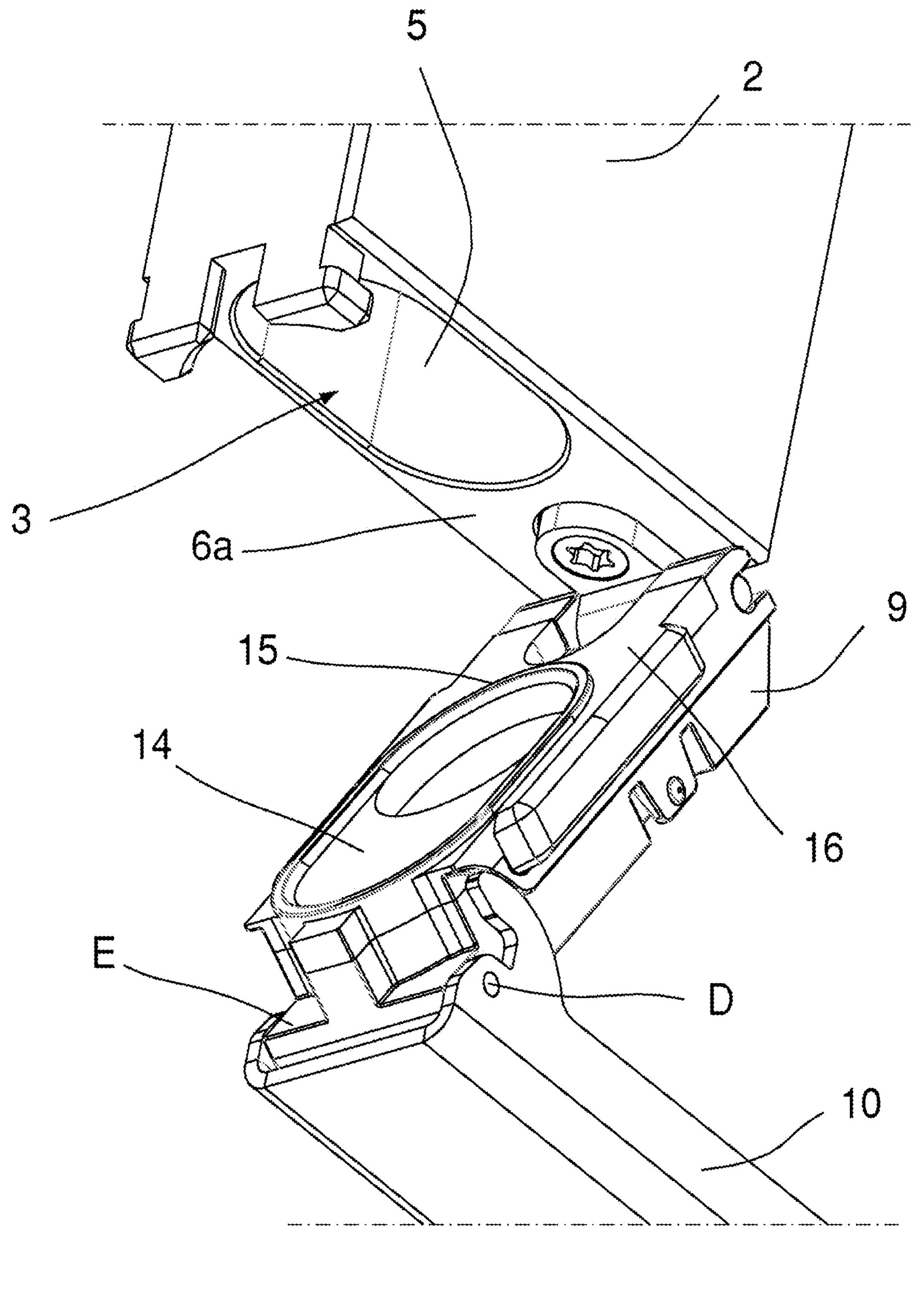
FIG. 4 also shows a padlock according to the present invention seen in a close-up of the first side of the padlock body and the cover device, from yet another angle.
Figure 5:
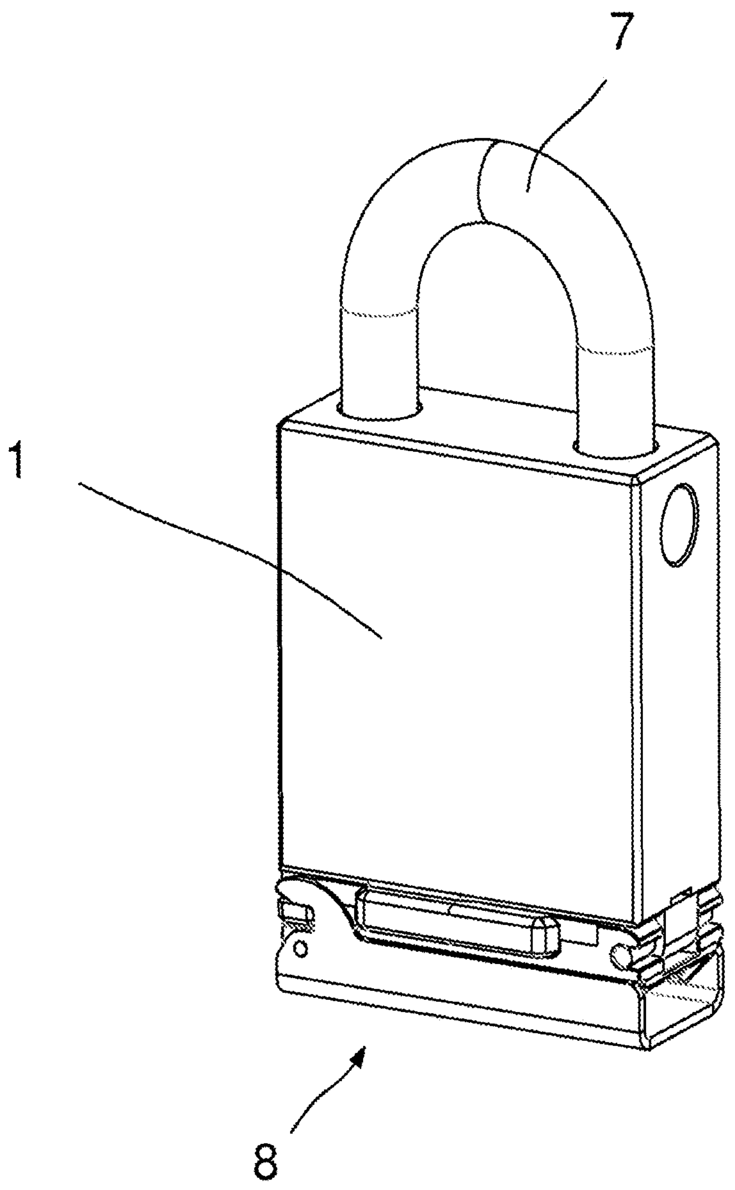
FIG. 5 shows a padlock according to the present invention, fully mounted with all active devices in working places.

The sealing device 9 comprises a support part 13 onto which a resilient material device 14 is attached and the support part 13 of the sealing device 9 is attached to the padlock body 2. The resilient material device 14 is facing and pushed against the first end 6_a_ of the padlock body 2 by the locking device 10. The resilient material device 14 comprises an elevated formation 15 extending around, along the sides of, the resilient material device 14, and in the form of the opening 5 or more, wider. The elevated formation 15 is placed on the area 16 of the resilient material device 14, aimed at the first end 6_a_ of the padlock body 2. The sealing function is not dependent om the size of the opening 5 and not on the size of the lock cylinder 4 to be used. And any kind of lock cylinder 4 can be placed in the cavity 3, one having for example an oval or round end form. The sealing function is at place as the elevated formation 15 is pushed and locked against the first end 6_a_ of the padlock body 2. See FIG. 4.

A padlock 1 according to the present invention comprises a padlock body 2 as described above and a shackle 7, attached to the padlock body 2 and locked in working position by using the lock cylinder 4.

A cover device 8 according to the present invention is to be attached to a padlock 1 or a padlock body 2 not yet mounted into a padlock construction. The cover device 8 will be mounted for covering a first end 6_a_ of a padlock body 2. The first end 6_a_ comprises an opening 5 into a cavity 3 inside the padlock body 2 designed for receiving a lock cylinder 4. The cover device 8 comprises a sealing device 9 and a locking device 10. The sealing device 9 is adapted, placed and held, against the first end 6_a_ of the padlock body 2, covering the opening 5, by the help of the locking device 10. The sealing device 9 is pivotally attached to the padlock body 2 and the locking device 10 is pivotally attached to the sealing device 9. The pivotation makes it possible to pivote, rotate, swing, move the sealing device 9 and the locking device 10 to a position where the cover device 8 is covering the first end 6_a_ of the padlock body 2 and the opening 5. The intention is to cover the full area of the first end 6_a_. The cover device 8 is made to be usable on different kinds of padlocks/padlock bodies having different sizes on the opening 5.

Such a cover device 8 can be directly connected to the padlock body 2, by use of second parts 11_b_ on the padlock body 2, first parts 11_a_ on the locking device 10 and the connecting device B, or by use of a superstructure attached to the padlock body 2. A superstructure is then attached to the padlock body 2 and comprises parts to be placed on the padlock body 2 and/or the cover device 8 to represent and give the functions needed as earlier described.

This is a description of one embodiment of the invention. The invention shall not be limited by this description but understood by the claims. Modifications, equivalents, and improvements may be included without departing from the spirit or scope of the present inventive concept as defined by the appended claims and their equivalents.

The invention claimed is:

1. A method for protecting a padlock from the environment where the padlock comprises a padlock body comprising a cavity, holding a lock cylinder, and an opening, where the opening is provided in a first end of the padlock body and connecting the cavity with the environment, the lock cylinder is inserted through the opening, and a shackle, attached to the padlock body in a second end of the padlock body opposite the first end, to be locked in working position by using the lock cylinder, wherein the first end of the padlock body is covered by using a covering device comprising a sealing device and a locking device, by placing the sealing device against the first end of the padlock body and placing the locking device to cover the sealing device and bringing the locking device into locking cooperation with the padlock body and where the covering is made by pivoting the sealing device in correlation to and towards the padlock body and pivoting the locking device in correlation to and towards the sealing device and towards the padlock body.

2. The method according to claim 1 where, by pivoting the locking device against the sealing device and the padlock body, activating a locking function between cooperating first parts of the locking device and the padlock body.

3. The method according to claim 1 where, by pivoting the locking device against the sealing device, activating a snap/grip function between cooperating second parts of the sealing device and the locking device.

4. A padlock body comprising a cavity and an opening at a first end of the padlock body, through which opening a lock cylinder is to be inserted when forming a working padlock, and through which the cavity is in communication with the outside, and comprising a covering device, attached to the padlock body and covering the first end of the padlock body comprising the opening, wherein the covering device comprises a sealing device and a locking device, the padlock body, the sealing device and the locking device comprising cooperating parts, where the sealing device, in working position, is placed and held by the cooperating parts against the first end of the padlock body by the locking device and where the sealing device is pivotally attached to the padlock body and the locking device is pivotally attached to the sealing device.

5. The padlock body according to claim 4, wherein the cooperating parts of the locking device and the padlock body are hooked into each other when the locking device is pivoted against the sealing device for activating a locking function between the locking device and the padlock body.

6. The padlock body according to claim 4, wherein the cooperating parts of the sealing device and the locking device snaps/grips into each other when the locking device is pivoted against the sealing device, activating a snap/grip function between the sealing device and the locking device.

7. The padlock body according to claim 4, wherein the sealing device comprises a support part onto which a resilient sealing material device is attached.

8. The padlock body according to claim 7, wherein the resilient sealing material device is facing and is pushed against the first end of the padlock body.

9. The padlock body according to claim 7, wherein the resilient sealing material device comprises an elevated formation extending around, along the sides of the resilient sealing material device, on an area aimed at the first end of the padlock body.

10. A padlock comprising the padlock body according to claim 4 and a shackle, attached to the padlock body and locked in working position by using a lock cylinder.

11. A cover device attachable to the padlock according to claim 10, wherein the cover device covers a first end of the padlock body comprising the opening into the cavity inside the padlock body that is designed for receiving a lock cylinder.

12. The cover device according to claim 11, wherein the cover device is directly, or by use of superstructures, connected to the padlock body.

* * * * *